United States Patent [19]

Endstra

[11] 4,145,505

[45] Mar. 20, 1979

[54] CROSS-LINKABLE ORGANOPOLYSILOXANE COMPOSITIONS AND A PROCESS FOR CROSS-LINKING ORGANOPOLYSILOXANES

[75] Inventor: Willem C. Endstra, Bathmen, Netherlands

[73] Assignee: Akzona Incorporated, Asheville, N.C.

[21] Appl. No.: 867,636

[22] Filed: Jan. 9, 1978

[30] Foreign Application Priority Data

May 13, 1977 [NL] Netherlands .................. 7705360

[51] Int. Cl.² .................................... C08G 77/04
[52] U.S. Cl. ............................ 528/10; 528/11; 528/24; 528/32; 528/43; 568/560; 568/566
[58] Field of Search ............. 260/46.5 G, 610 D; 528/10, 11, 24, 32, 43

[56] References Cited

U.S. PATENT DOCUMENTS

| | | | |
|---|---|---|---|
| 2,803,619 | 8/1957 | Dickmann | 260/42 |
| 2,819,236 | 1/1958 | Dickmann | 260/29.1 |
| 3,234,174 | 2/1966 | Williams | 260/46.5 G |
| 3,234,175 | 2/1966 | Pike | 260/46.5 G |
| 3,296,182 | 1/1967 | Fekete | 260/46.5 G |
| 3,660,345 | 5/1972 | Bobear | 260/46.5 G |

FOREIGN PATENT DOCUMENTS

| | | |
|---|---|---|
| 546861 | 10/1957 | Canada. |
| 563994 | 9/1958 | Canada. |
| 798667 | 7/1958 | United Kingdom. |
| 852820 | 11/1960 | United Kingdom. |

OTHER PUBLICATIONS

Chemical Abstracts, vol. 75, 7500v (1971).

*Primary Examiner*—Melvyn I. Marquis
*Attorney, Agent, or Firm*—Francis W. Young; Robert F. Green

[57] ABSTRACT

Cross-linkable organopolysiloxane compositions are disclosed, consisting essentially of an organopolysiloxane and bis(o-chlorobenzoyl)peroxide.

7 Claims, No Drawings

CROSS-LINKABLE ORGANOPOLYSILOXANE COMPOSITIONS AND A PROCESS FOR CROSS-LINKING ORGANOPOLYSILOXANES

BACKGROUND OF THE INVENTION

This invention relates to thermally cross-linkable organopolysiloxane compositions and to a method for cross-linking organopolysiloxane compositions.

Organopolysiloxane compositions, also known as silicone rubbers, may be cross-linked under the influence of organic peroxide free radical initiators. Thus, British Pat. No. 764,444 teaches a process for cross-linking silicone rubbers wherein a dispersion of an organic peroxide, such as bis(2,4-dichlorobenzoyl)peroxide, in a liquid organopolysiloxane having a viscosity of 250 to 5000 centistokes at 25° C., such as dimethylsiloxane or methylphenylsiloxane, is utilized.

Canadian Pat. Nos. 546,861 and 563,994 teach that bis(2,4-dichlorobenzoyl)peroxide may be used as a cross-linking initiator in the preparation of siloxane elastomers. Canadian Pat. No. 546,861 recommends that bis(2,4-dichlorobenzoyl)peroxide, benzoyl peroxide, and bis(p-chlorobenzoyl)peroxide be utilized to prepare siloxane elastomers under pressure. From German Auslegschrift No. 1,007,057, it appears that for satisfactory adhesion of an organopolysiloxane elastomer to a surface, the use of bis(monochlorobenzoyl)peroxide as the cross-linking initiator is preferred to either benzoyl peroxide or bis(2,4-dichlorobenzoyl)peroxide.

The use of bis(p-chlorobenzoyl)peroxide as an initiator for cross-linking silicone rubbers in a mold under pressure has the disadvantage that the time required to attain the desired degree of cross-linking is relatively long, thus making its use economically unattractive. If bis(p-chlorobenzoyl)peroxide is utilized for the cross-linking of silicone rubber without pressure being applied, the resulting elastomers will have poor physical properties, such as low modulus value and a high compression set. A drawback to the use of bis(2,4-dichlorobenzoyl)peroxide for cross-linking silicone rubbers, is the fact that the resulting silicone rubbers display the so-called blooming effect.

From the foregoing, it is apparent that a need exists for cross-linkable silicone rubber compositions which do not suffer from the foregoing deficiencies, as well as for a more desirable process for cross-linking such compositions.

SUMMARY OF THE INVENTION

It has now been discovered that bis(o-chlorobenzoyl)peroxide is exceptionally well suited as a peroxidic free-radical initiator for cross-linking silicone rubbers.

Surprisingly, by utilizing bis(o-chlorobenzoyl)peroxide in the cross-linking of silicone rubbers, the time necessary to achieve the cross-linking of the rubbers under pressure is reasonably acceptable and the resulting elastomers do not suffer from blooming and have good physical properties.

The novel compositions of the present invention thus consist essentially of (1) an organopolysiloxane having structural units defined by the formula $RR_1SiO$ wherein R is an alkyl group having from 1 to about 4 carbon atoms and $R_1$ is selected from the group consisting of alkyl having from 1 to about 4 carbon atoms, aryl having 6 carbon atoms, aralkyl having from about 7 to about 9 carbon atoms, cycloalkyl having from about 6 to about 9 carbon atoms, alkenyl having from 2 to about 4 carbon atoms, and cycloalkenyl having 6 carbon atoms and (2) bis(o-chlorobenzoyl)peroxide which is present in an amount sufficient to achieve at least partial cross-linking of the organopolysiloxane at a temperature below the decomposition temperature of said organopolysiloxane.

The process of the present invention is a process for cross-linking an organopolysiloxane comprising heating an organopolysiloxane, as defined above, in the presence of bis(o-chlorobenzoyl)peroxide, to a temperature below the decomposition temperature of said organopolysiloxane, said temperature being sufficient, and said peroxide being present in an effective amount, so that the organopolysiloxane is at least partially cross-linked.

DESCRIPTION OF THE PREFERRED EMBODIMENTS

In the organopolysiloxanes useful in the practice of the present invention, typical alkyl groups include methyl, ethyl, and propyl, and a typical aryl group is phenyl. Also, benzyl and phenyl ethyl are typical aralkyl groups and cyclohexyl is a typical cycloalkyl group. Finally, vinyl and allyl are exemplary of the alkenyl groups useful in the present invention and typical cycloalkenyl groups include cyclohexenyl.

In certain organopolysiloxane compositions, the structural units may have both R and $R_1$ groups the same and exemplary of such units are dimethylsiloxy, diethysiloxy, and diphenylsiloxy. Also, such compositions may have structural units in which both R and $R_1$ groups are different, such structural units being exemplified by methylphenylsiloxy, phenylethylmethylsiloxy, ethylphenylsiloxy, methylvinylsiloxy, and phenylvinylsiloxy, all as described in U.S. Pat. No. 2,953,543.

The bis(o-chlorobenzoyl)peroxide may be incorporated into the silicone rubbers in any amount, so long as it is sufficient to achieve at least partial cross-linking of the rubber. The peroxide may be incorporated into the rubber in accordance with known procedures. Typically, the amount of said peroxide will range from about 0.5 to about 10 mmoles, preferably from about 1 to about 5 mmoles, per 100 grams of polymer.

The temperature utilized to cross-link the organopolysiloxane is not critical, but should be less than the decomposition temperature of the siloxane, for obvious reasons. Also, the temperature utilized should be sufficient so that at least partial cross-linking of the siloxane occurs. Of course, it is usually preferable to substantially completely cross-link the siloxane. Typical cross-linking temperatures are usually in the range of from about 70° C. to about 150° C., more typically in the range of from about 90° C. to about 130° C.

The cross-linking may also occur under the influence of pressure, although it is not necessary for pressure to be utilized. If the cross-linking is done in the presence of pressure, typical pressures are usually in the range of from about 20 psi to about 600 psi, more typically in the range of from about 70 psi to about 300 psi.

The heat required to achieve the cross-linking may be applied in accordance with any known procedure. Thus, heat may be applied, for example, by using hot air treatment, radiation, or heated molds.

Of course, the compositions may also include other constituents such as fillers, antidegredants, and the like.

The present invention will be explained in further detail by the following examples which are only representative in nature and are not a limitation upon the scope of this invention.

EXAMPLES I AND II

100 Grams of a vinyl modified dimethyl siloxane rubber were mixed with 2 mmoles (0.62 weight percent) of bis(o-chlorobenzoyl)peroxide, on a two-roll mill, and the resultant composition rolled into a layer having a thickness of 2 mm. A sample of the layer was pre-formed in a mold for 1 minute at 20° C. to obtain a smooth surface, after which it was cross-linked in an oven with air having a temperature of 110° C., with no application of pressure to the pre-formed mold (Example I). A second such sample was cross-linked in a heated mold having a temperature of 110° C., with application of about 350 psi pressure for 15 minutes (Example II).

COMPARATIVE EXAMPLES A — C

Compositions containing the same silicone rubber as in Examples I and II were made utilizing the same procedure as in Example I except the bis(o-chlorobenzoyl)peroxide was replaced with 0.48 weight percent dibenzoyl peroxide (Example A), 0.76 weight percent bis(2,4-dichlorobenzoyl)peroxide (Example B), or 0.62 weight percent bis(p-chlorobenzoyl)peroxide (Example C). Identical samples of the foregoing materials were utilized to make cross-linked materials utilizing the procedure of Example II, with application of pressure and the samples identified as A′, B′, and C′.

The compositions of the foregoing Examples and Comparative Examples were analyzed for their $t_2$ and $t'_{90}$ cross-linking times (minutes) in conformity with ASTM D 2705 and for their tensile strength and modulus 200% (conformity with ISO R37, type 1), and their compression set values (conformity with ASTM D395, method B) and the results are summarized in the Table, as follows:

TABLE

| Sample | $t_2$ | $t'_{90}$ | Tensile Strength (kg/cm$^2$) | Modulus 200% (kg/cm$^2$) | Compression Set After 24 Hours At 150° (%) |
|---|---|---|---|---|---|
| 1 | 2.3 | 7.0 | 69 | 41 | 48 |
| A | 6.4 | 22.3 | 50 | 20 | 65 |
| B | 2.8 | 7.6 | 66 | 33 | 54 |
| C | 6.1 | 37.7 | 23 | 18 | 85 |
| II | — | — | 85 | 40 | 30 |
| A′ | — | — | 80 | 40 | 32 |
| B′ | — | — | 90 | 35 | 36 |
| C′ | — | — | 48 | 31 | 38 |

What is claimed is:
1. A thermally cross-linkable composition consisting essentially of
   (1) An organopolysiloxane having structural units defined by the formula RR$_1$SiO, wherein R is an alkyl group having from 1 to about 4 carbon atoms and R$_1$ is selected from the group consisting of alkyl having from 1 to about 4 carbon atoms, aryl having 6 carbon atoms, aralkyl having from about 7 to about 9 carbon atoms, cycloalkyl having from about 6 to about 9 carbon atoms, alkenyl having from 2 to about 4 carbon atoms, and cycloalkenyl having 6 carbon atoms; and
   (2) bis(o-chlorobenzoyl)peroxide which is present in an effective amount so that at least partial cross-linking of the organopolysiloxane occurs at a temperature below the decomposition temperature of said organopolysiloxane.
2. The composition of claim 1 containing from about 0.5 to about 10 moles of bis(o-chlorobenzoyl)peroxide per 100 grams of organopolysiloxane.
3. The composition of claim 1 containing from about 1 to about 5 mmoles of bis(o-chlorobenzoyl)peroxide per 100 grams of organopolysiloxane.
4. A process for cross-linking an organopolysiloxane comprising heating an organopolysiloxane having structural units defined by the formula RR$_1$SiO, wherein R is an alkyl group having from 1 to about 4 carbon atoms and R$_1$ is selected from the group consisting of alkyl having from 1 to about 4 carbon atoms, aryl having 6 carbon atoms, aralkyl having from about 7 to about 9 carbon atoms, cycloalkyl having from about 6 to about 9 carbon atoms, alkenyl having from 2 to about 4 carbon atoms, and cycloalkenyl having 6 carbon atoms, in the presence of an effective amount of bis(o-chlorobenzoyl)peroxide, to a temperature sufficient so that at least partial cross-linking of the siloxane occurs, said temperature being below the decomposition temperature of the organopolysiloxane.
5. The process of claim 4 wherein the heating occurs simultaneously with the application of external pressure to the organopolysiloxane.
6. The process of claim 4 wherein the bis(o-chlorobenzoyl)peroxide is present in an amount of from about 0.5 to about 10 mmoles per 100 grams of organopolysiloxane.
7. The process of claim 4 wherein the bis(o-chlorobenzoyl)peroxide is present in an amount of from about 1 to about 10 mmoles per 100 grams of organopolysiloxane.

* * * * *